Sept. 14, 1954 M. D. McSHURLEY ET AL 2,689,124
TRANSFER MECHANISM
Filed April 5, 1950
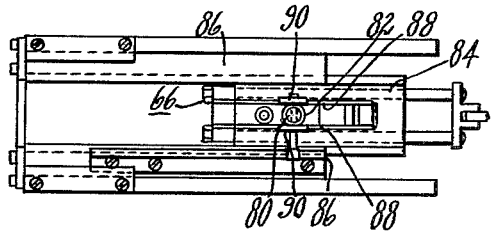
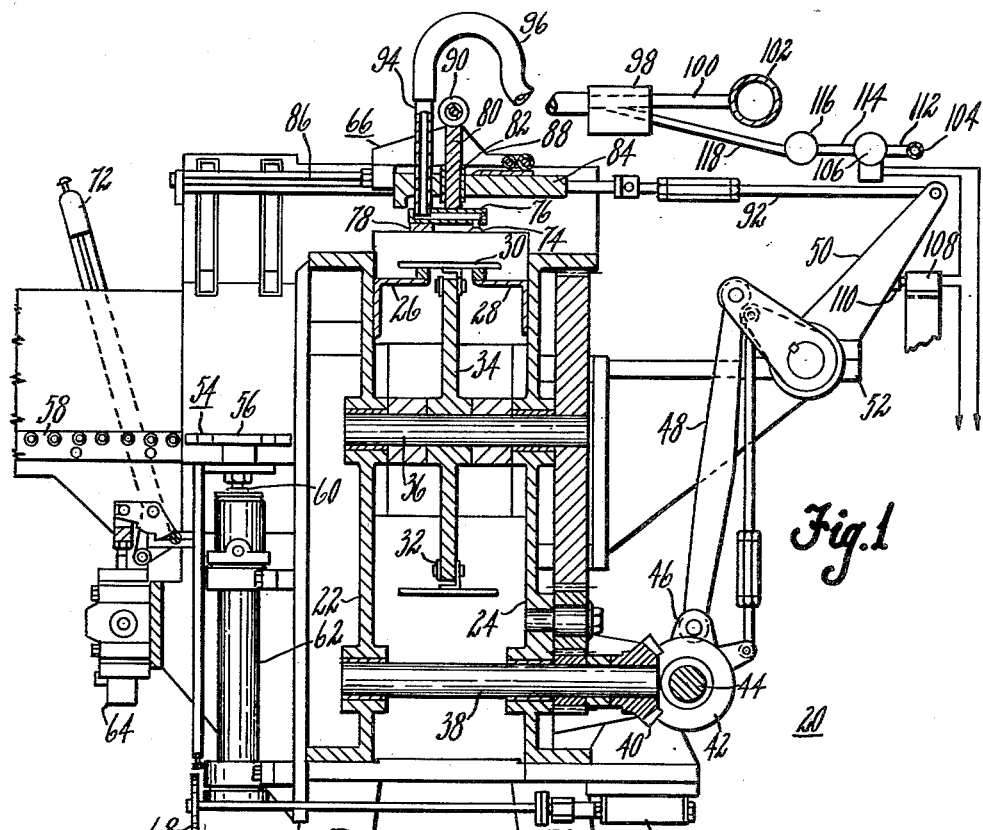
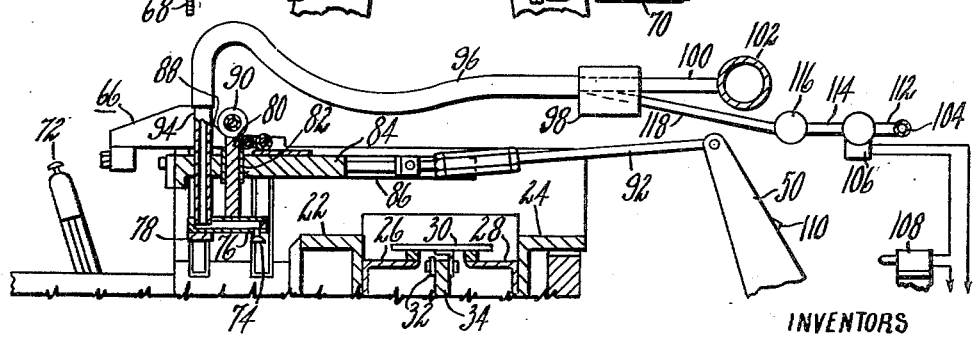
INVENTORS
MARSHALL D. McSHURLEY
DONALD G. MAHONEY
BY
THEIR ATTORNEYS Patented Sept. 14, 1954

2,689,124

UNITED STATES PATENT OFFICE 2,689,124

TRANSFER MECHANISM

Marshall D. McShurley, Daleville, and Donald G. Mahoney, Muncie, Ind., assignors to General Motors Corporation, Detroit, Mich., a corporation of Delaware Application April 5, 1950, Serial No. 154,168

2 Claims. (Cl. 271—14)

This invention relates to transfer methods and mechanisms and is particularly directed to vacuum transfer methods and mechanisms and means for detaching materials being transferred from said mechanisms.

It is the basic object of the invention to provide a method and apparatus for transferring sheet or plate stock from one postion to another wherein a vacuum cup pick-up is used which may be actuated to release the material being transferred at a given time. In carrying out this object, it is a further object to provide a method and means for nullifying the vacuum supplied to the vacuum cups without actually interrupting the vacuum application whereby cut-offs and the like in the vacuum lines are eliminated.

A still further object of the invention is to provide a method and apparatus for transferring battery plates in a battery plate stacking machine from one position to another wherein positive release of the battery plates from the vacuum transfer mechanism is accomplished through the use of an air blast superimposed upon the vacuum.

In carrying out the above object it is a further object to momentarily superimpose an air blast having sufficient pressure to nullify the vacuum at the vacuum cups wherein the vacuum line and the pressure line are so dimensioned that the application of pressure does not markedly disturb the pressure balance in the vacuum line.

A still further object of the invention is to provide an electrically operated valve which is placed in a high pressure air line and which is momentarily opened to superimpose pressure on a vacuum cup or other type of transfer mechanism whereby the vacuum cup releases material being held thereby.

Further objects and advantages of the present invention will be apparent from the following description, reference being had to the accompanying drawings wherein a preferred embodiment of the present invention is clearly shown.

In the drawings:

Fig. 1 is a view, in section, of a plate stacking machine showing one stacking station.

Fig. 2 is a fragmentary view, partly in section, showing the upper portion of the machine shown in Fig. 1 in another position.

Fig. 3 is a top view of the vacuum cup transfer mechanism shown in Fig. 1.

Transfer mechanisms for moving sheet or plate material from one position to another are made in various forms. Most of these machines include a vacuum cup pickup for moving the material. One of such devices is shown and described in McShurley application Serial No. 69,925 copending herewith, now Patent No. 2,568,246, granted Sept. 18, 1951, wherein a stacking machine, for use in the manufacture of storage batteries, is disclosed. This machine includes a plurality of stacking stations, each one of which includes a transfer mechanism. It is understood that any number of stations may be used in such a machine, the number being limited merely by the number of plates to be stacked in a given assembly. In the battery plate stacking machine, the transfer mechanism takes separators, positive plates, separators and negative plates from successive magazines and stacks them in a step-by-step process on pallets or element receiving plates attached to a continuous conveyor. Each time a plate or separator is removed from the magazine, the magazine is hydraulically lifted the thickness of the removed plate or separator so that on the next movement of the transfer mechanism, a plate or separator is in position to be picked up by the vacuum cups and transferred to the element receiving plate on the conveyor means.

In the McShurley disclosure herein referred to, a vacuum is imposed on the vacuum cups to insure their pickup of the plates and separators from the magazine and of the transfer. When the transfer mechanism is laterally moved immediately adjacent the pallet on the receiving element on the conveyor, this vacuum is cut off and the cup is opened to the atmosphere which permits the plate to drop by gravity from the vacuum cups.

While this set-up works perfectly if the lines are clean there are times when these lines do not remain clean with the result that the plates or separators continue to be gripped by the suction and do not drop upon the stack of assembled plates and separators at the right moment thereby fouling the entire operation of the device.

The present invention is directed to an improvement in the transfer mechanism shown in said McShurley application and specifically provides positive means for removing plates and separators from the vacuum cups when they are in the proper position to be removed and to be stacked upon the plate receiving elements. This positive means is embodied in the use of a pressure line connected to the vacuum cups which superimposes high pressure momentarily on the vacuum cups to nullify the vacuum and blow the plates off the cups. In this respect, the vacuum is never cut off on any cup but high pressure air is momentarily forced through the cups in sufficient quantity to nullify the vacuum therein. We have found that the high pressure air has little effect on the vacuum balance in the main portion of the line if the manifolds for vacuum and manifolds for high pressure air are maintained in balance, that is, the vacuum manifold is at least five times the cross sectional area of the air manifold. In this manner, due to the pressure of the air, the vacuum is nullified at the cups but there is not sufficient air introduced to in any way destroy the vacuum balance or appreciably lower the same within the system.

We have found that this method and apparatus is not only effective to remove plates or other sheet material from the transfer mechanism but is positive in its operation and furthermore causes the ducts, leading to the vacuum cups, to remain clear of extraneous material which might reduce the effectiveness of the cups in the transfer operation. This is explained by the fact that on each blow-off, the ducts to the cups are effectively cleaned.

Referring specifically to the drawings, Fig. 1 shows a cross section through a machine 20 similar to that noted in the McShurley application, Serial No. 69,925 with modifications embodying the present invention. The drawing of the machine 20, as shown in Fig. 1, illustrates a section through one station of the apparatus. The machine 20 comprises two side frame members 22 and 24 suitably spaced and supported from the floor, which members 22 and 24 include longitudinally extending rails 26 and 28 for the plate element receiving pallets 30. The elements 30 are connected to a chain 32 which passes around a sprocket 34 which is carried by shaft 36 journaled in the frame members 22 and 24. The shaft is connected to a driving means, not shown, which driving means is also connected to shaft 38 that drives bevel gear 40 which, in turn, meshes with gear 42. Gear 42 is carried by a shaft 44 which also carries an eccentric crank arm 46 connected to a rod 48 which drives a reciprocating lever 50 journaled in a bracket 52 carried by the frame member 24. Thus on each revolution of the shaft 38, the lever 50 is carried from one extreme position to the other as noted in Figs. 1 and 2. The magazine for plates is shown on the opposite side of the apparatus at 54 and comprises a table 56 upon which the plates may be transferred from a roller conveyor mechanism 58 if desired. The table 56 is carried by a piston rod 60 which operates from a hydraulic cylinder 62. The hydraulic circuit for cylinder 62 is controlled by a valve (not shown) whereby said valve permits oil to flow into the cylinder to raise the table upon each reciprocation of a transfer mechanism 66 as governed by movement of lever 50. Each time the transfer mechanism 66 picks a plate from the table 56, the table moves upwardly a distance equal to the thickness of the plate removed. Movement of the table may be adjusted by use of adjustment screw 68 which controls a metering cylinder 70 which, in turn, controls the quantity of oil passed into cylinder 62 by the control valve. Lever 72 is provided for controlling the action of valve 64 when it is desired to move the table 56 upwardly or downwardly in a rapid movement.

Referring particularly to the transfer mechanism 66, a plurality of vacuum cups 74 are provided on a plate carrier 76 which is channeled out to permit free flow therein. A pad 78 is provided at the opposite end of plate carrier 76 so that sheet material such as battery plates or separators drawn against the vacuum cups 74, will be held level by contact with the pad 78. The entire plate 76 is carried by a vertical rod 80 which is guided through a bushing 82 in carriage 84. The carriage 84 is movable in tracks 86 to its other extreme position as shown in Fig. 2.

The vertical position of the vacuum cups and the plate carrier 76 is controlled by camming surfaces 88 upon which rollers 90 ride, which rollers 90 are carried by the upper end of the vertical rod 80. Thus when the transfer mechanism 66 is in one extreme position as shown in Fig. 1, the vacuum cups and plate carrier are held upwardly due to the fact that rollers 90 are at the high portion of the cams 88. On the other hand when the transfer mechanism 66 is in the other extreme position, as noted in Fig. 2, the rollers 90 are at the low portion of cams 88 and the plate carrier is in a lowered position adjacent the magazine where it may pick up a plate or separator. In this position, the lever 50 has moved counterclockwise to slide the mechanism 66 laterally through the action of connecting rod 92. When lever 50 moves in a clockwise position, it draws the mechanism 66 into the position shown in Fig. 1 where the vacuum cups and plate carrier are in raised position directly above an element 30. The whole machine 20 is timed so that the transfer mechanism 66 will be in the extreme position shown in Fig. 1 at the instant that one of the elements 30 is directly therebeneath.

The vaccum nullifying procedure is utilized in this position of the vacuum cups 74. It will be noted that the vacuum cups 74 through the plate carrier 76 are connected by a duct to a pipe 94 which is connected through a flexible rubber tube 96 to a Y-fitting 98. In a conventional manner the Y-fitting 98, as shown, includes a pair of opposed legs and a base leg. One of the opposed legs of the Y-fitting 98 is connected by a pipe 100 to a vacuum manifold 102 in which a predetermined vacuum is maintained at all times, and the base leg of the Y-fitting 98 is connected to the vacuum cups by means of tube 96 and conduit 94. Thus the vacuum cups 74 when in position shown in Fig. 2, have a strong vacuum applied thereto whereby the pickup of the plates or separators from the magazine table 56 and their transfer across the apparatus to a position directly above the elements 30 as shown in Fig. 1, is accomplished. At this point the vacuum is nullified through a momentary shot of high pressure air from a manifold 104, which is connected to the other opposed leg of the Y-fitting 98 by means of pipes 112, 114 and 118. The arrangement of parts is such that a stream of air under high pressure is directed angularly toward the base leg of the Y-fitting 98 and, thus, toward the vacuum cups 74, while the same stream of high pressure air is directed away from the vacuum supply leg of the Y-fitting 98 and the vacuum supply associated with manifold 102. This air is controlled by a normally closed solenoid valve 106 which is in series with a micro switch 108 that is actuated by the extreme clockwise movement of the lever 50 which closes the normally open switch through abutment of pad 110 to close the switch 108 to energize the circuit of the solenoid valve 106 to open the same and allow high pressure air to pass from manifold 104 through the pipe 112, solenoid valve 106, pipe 114, check valve 116, pipe 118 to the Y-fitting 98 whereupon the high pressure air is superimposed upon the vacuum at the vacuum cups 74 to actually blow the plates off the cups onto the element 30. Since the lever 50 immediately starts to move in a counterclockwise position after reaching its extreme clockwise movement, the microswitch 108 is immediately open to break the circuit to the solenoid valve 106 which shuts off the air pressure to the vacuum cups whereby the vacuum is immediately reinstated.

It will be noted that the manifold 102 for the vacuum is considerably larger than the manifold 104 for the pressure whereby the momentary surges of pressure in the line caused by the opening of solenoid valve 106 do not disturb the vacuum balance since the vacuum line has much greater volume. This ratio of vacuum line balance to pressure line volume should be at least five to one, although any ratio which will provide the desired results is satisfactory, it being obvious that if a vacuum pump of sufficiently great capacity, is utilized, the relative sizes of the manifolds will probably be of slight importance. In any event, in the present set-up using high pressure air in the order of 70 pounds per square inch together with 15–20″ of mercury vacuum, it is possible to inject a momentary shot of air through vacuum cups 74 which actually momentarily nullifies the vacuum at the cups and blows the plates therefrom to provide a positive ejection on the transfer mechanism.

It is apparent that this transfer mechanism may be used in connection with any type of machinery where a transfer of sheet or plate material is desired, which sheet or plate material may be picked up by vacuum cups. The invention is not limited in its application to a plate stacking machine, this merely being one embodiment of the use of the method of transfer and apparatus of the novel transfer mechanism.

It is further to be understood that instead of a solenoid valve in the air pressure line, any control which will normally inject high pressure air into the line may be used, such as a cam operated control which may be opened momentarily by any of the levers, such as lever 50, the electrically controlled circuit as shown being the most facile manner of accomplishing the desired result.

While the embodiment of the present invention as herein disclosed, constitutes a preferred form, it is to be understood that other forms might be adopted.

What is claimed is as follows:

1. A vacuum pickup apparatus for transferring sheet material from one position to another position including a reciprocating carrier movable between said two positions, vacuum cups carried by said carrier, and cam means for lowering the carrier in one position to effect a vacuum pickup of sheet material at said one position; comprising in combination, a vacuum supply, a fluid pressure supply, a Y-fitting having a pair of opposed legs and a base leg, means connecting one opposed leg to the vacuum supply, means connecting the other opposed leg to the fluid pressure supply, means connecting the base leg to the vacuum cups, valve means interposed between the pressure supply and said other opposed leg, and a controller operatively associated with said carrier and said valve means and actuated when the carrier is in the other position to effect momentary opening of said valve means whereby a stream of fluid under pressure is directed angularly towards said base leg and said vacuum cups and away from said opposed vacuum leg and said vacuum supply for momentarily overcoming the vacuum at said cups to effect a release of the sheet material at the other position.

2. The combination set forth in claim 1 wherein the means connecting the vacuum supply and said one opposed leg of the Y-fitting continuously interconnects the vacuum cups and the vacuum supply.

References Cited in the file of this patent

UNITED STATES PATENTS

| Number | Name | Date |
|---|---|---|
| 1,418,145 | Fischer | May 30, 1922 |
| 2,167,470 | West | July 25, 1939 |